March 10, 1925.                                                              1,528,827
C. H. HAPGOOD
MEANS FOR MOUNTING SHEETS OF GLASS
Filed Aug. 20, 1921
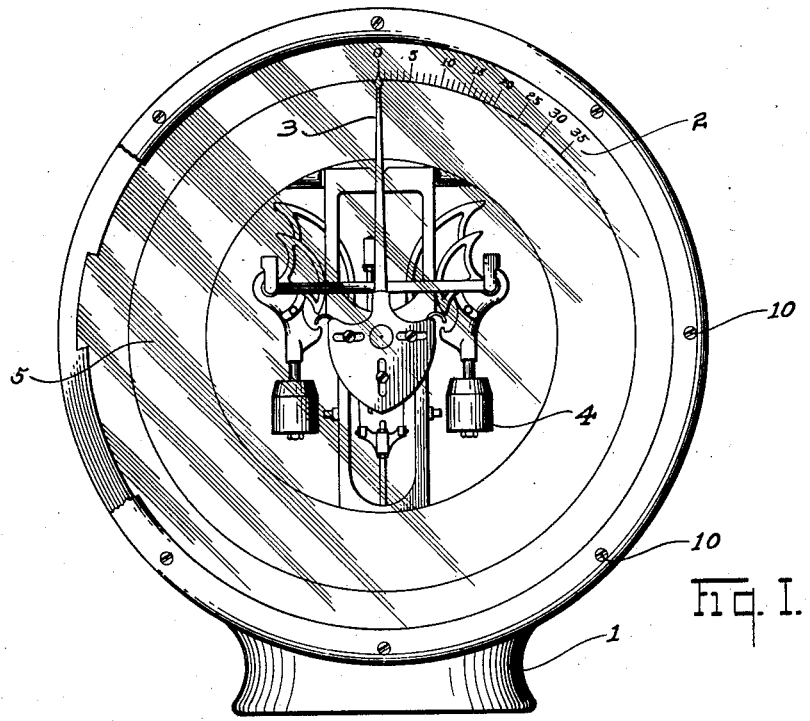
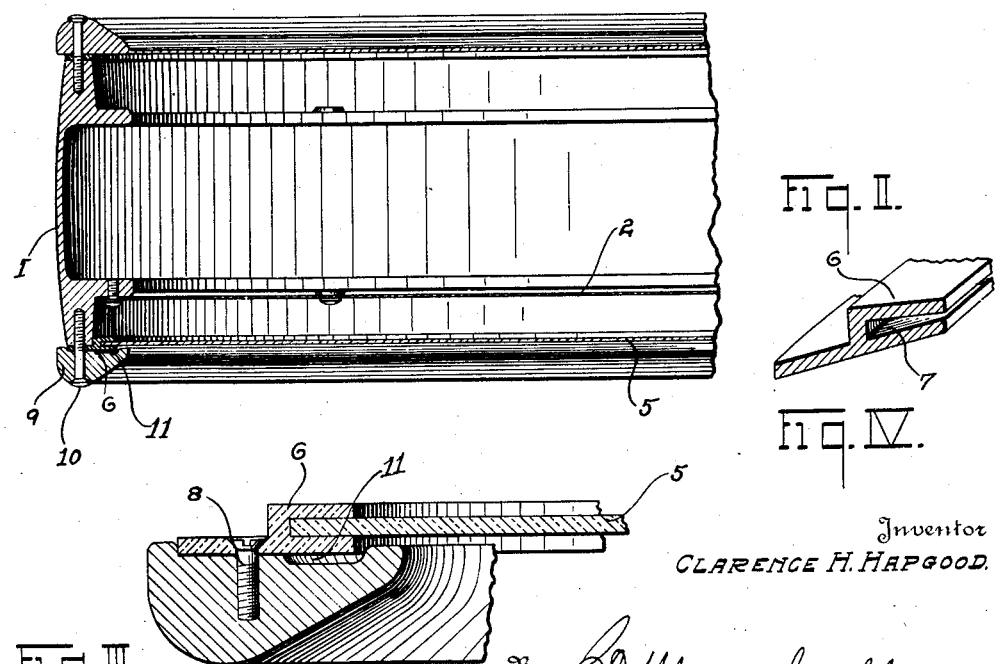
Inventor
CLARENCE H. HAPGOOD.
By C. D. Marshall
Attorney Patented Mar. 10, 1925.

1,528,827

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

MEANS FOR MOUNTING SHEETS OF GLASS.

Application filed August 20, 1921. Serial No. 494,018.

*To all whom it may concern:*

Be it known that I, CLARENCE H. HAPGOOD, a citizen of the United States, residing at Toledo, in the county of Lucas and State of Ohio, have invented certain new and useful Improvements in Means for Mounting Sheets of Glass, of which the following is a specification.

This invention relates to means for securing in place frangible sheets of material, such as the glass plates of wind shields, the crystals covering the dials of indicating instruments, the glass fronts of automobile lamps, etc.

One of the objects of the invention is to provide a flexible and elastic support for sheets of glass, which support is adapted for attachment to a frame, so that the liability of breakage in moving or shipping is reduced to a minimum.

Another object is to provide a flexible support capable of maintaining a leak-proof joint with the glass and the frame to which it is attached.

Other objects and advantages will be apparent from the following description, in which reference is had to the accompanying drawings illustrating a preferred embodiment of my invention and wherein similar reference numerals designate similar parts throughout the several views.

In the drawings:—

Figure I is an elevation showing the indicating dial of a weighing scale having a crystal supported according to my invention, a part of the bezel being broken away to show the supporting device;

Figure II is an enlarged sectional view through a housing similar to that shown in Figure I, the weighing mechanism being omitted;

Figure III is a further enlarged sectional detail view showing a fragment of the bezel having the supporting member and glass attached thereto; and Figure IV is a fragmentary sectional view of the supporting member of my invention.

I have shown my invention as applied to the circular crystal or window which covers the dial of a weighing scale, but it is to be understood that the invention is not limited to devices in which the sheet of frangible material to be supported is circular, but that it is also applicable where the supported sheet is of other shapes.

The weighing scale frame or housing 1 which is shown in Figures I and II is substantially watch-case-shaped, and contains a dial 2 and indicating hand 3 which, with the automatic load-offsetting mechanism 4, is visible through a circular glass window 5. In securing the glass in place I employ a gasket 6 of soft rubber or similar material which is shaped substantially like the periphery of the glass to be supported, being in this case annular.

The gasket is provided in its inner edge with a groove 7 of substantially the shape shown in Figure IV, which, when the groove is slipped over the edge of the sheet of glass, folds the lips of the groove in close contact with the faces of the glass.

The gasket is also made of such size that the length of the bottom of the groove 7 is slightly less than the periphery of the glass, so that the gasket hugs the glass tightly when it is in place.

In order to further insure the tightness and permanence of the joint between the glass and the gasket, the interior of the groove 7 is coated with a suitable adhesive cement before it is applied to the glass. The joint between the glass and the gasket is thus made absolutely leak-proof.

After the gasket 6 has been secured to the glass it is fastened by means of two or more screws 8 to a bezel 9, and the bezel is then secured to the housing 1 by means of a series of screws 10. As the screws 10 are tightened the portion of the gasket which lies between the bezel and the housing is compressed and a leak-proof joint is thus formed between the gasket and housing. This is an important feature of my invention, especially when it is applied to automatic scales, since scales of this type are commonly used in creameries and abattoirs and similar places that are flushed out daily and the hose is often played upon scales used in such places.

It has been found to be very difficult to secure the requisite tightness by clamping ordinary gaskets of compressible material, such as rubber, felt and cork, against the glass, since the face of the bezel, the glass and the housing are not apt to be perfectly true, and when this is the case the strains that are set up in clamping the gaskets sufficiently tight to prevent leakage often result in breakage.

Owing to the fact that cast metal bezels and cast metal housings are often slightly warped, there is great liability of breakage when glass plates are clamped between such bezels and housings or against such bezels or housings even when a gasket of resilient material is interposed between the glass and the metal. When the glass is secured first to the bezel it is liable to be broken if the bezel is warped, and when the bezel is secured to the housing the glass is again liable to be broken when the bezel springs to conform to the shape of the housing. I avoid this breakage by so constructing and arranging the housing gasket and bezel that the glass is suspended in the flexible gasket, no part of the gasket being compressed between the glass and the bezel or the glass and the housing. The bezel extends over and conceals the gasket when it is in place, but, as will be apparent by inspection of Figures II and III, the rear face of the bezel is provided with a shallow, wide groove 11 so that it does not press against the portion of the gasket which lies between it and the glass.

With the glass supported by the gasket of my invention the bezel or the housing may be dropped or otherwise jarred with very little danger of breaking the glass, since the gasket by means of which the glass is supported forms a very efficient shock absorber.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a device of the class described, in combination, a frame having an opening therein, a plate of frangible material, a gasket having a groove which receives the edge of said plate, a bezel, said gasket having a flange secured to said bezel, said bezel overlying the portion of said gasket which receives the edge of said plate, the overlying portion of said bezel being cut out to prevent compression of said gasket between said plate and said bezel, and means for attaching said bezel to said frame.

2. A combined gasket and support for a sheet of frangible material comprising an endless strip of material with a groove along its inner periphery, the walls of the groove at its open side being nearer each other than adjacent the bottom of the groove, whereby the lips of the groove will tend to remain in close contact with the faces of the sheet of material supported thereby, and the bottom of the groove being of less length than the periphery of the sheet to which the strip is to be applied, whereby the strip, when in place, is stretched about the sheet.

3. In a device of the class described, in combination, a plate of frangible material, a resilient supporting gasket secured to the edge of said plate, a bezel secured to said gasket, a frame having an opening therein, and means for securing said bezel to said frame, the parts being so constructed and arranged that when assembled a portion of said resilient supporting gasket lies compressed between said bezel and said frame and in leak-proof engagement with both said bezel and said frame and said plate of frangible material overlies said opening.

4. In a device of the class described, in combination, a sheet of frangible material, an endless flexible gasket having a groove receiving the edge of said sheet of frangible material, said gasket having an outwardly extending flange, a bezel to which said flange is secured, a frame to which said bezel is secured, the flange of said gasket being in engagement with and compressed between said bezel and said frame, thereby forming a leak-proof joint.

5. In a device of the class described, in combination, a weighing scale housing, a frame having an opening for displaying indicating mechanism, a bezel surrounding said opening, a gasket of flexible material having a portion confined between said bezel and said frame and having an interiorly opening groove surrounding said opening, and a sheet of glass overlying said opening and having its peripheral edge received in said groove.

CLARENCE H. HAPGOOD.

Witnesses:
HARRY O. ERNSBERGER,
FRANCES DOYLE.